US012687631B2

(12) United States Patent
Lei

(10) Patent No.: US 12,687,631 B2
(45) Date of Patent: Jul. 21, 2026

(54) SIGNAL EXTRACTION CIRCUIT, SIGNAL EXTRACTION METHOD, AND DISTANCE MEASUREMENT METHOD AND DEVICE

(71) Applicant: Ningbo ABAX Sensing Electronic Technology Co., Ltd., Ningbo City (CN)

(72) Inventor: Shuyu Lei, Ningbo City (CN)

(73) Assignee: Ningbo ABAX Sensing Electronic Technology Co., Ltd., Ningbo City (CN)

( * ) Notice: Subject to any disclaimer, the term of this patent is extended or adjusted under 35 U.S.C. 154(b) by 1095 days.

(21) Appl. No.: 17/778,956

(22) PCT Filed: Sep. 29, 2020

(86) PCT No.: PCT/CN2020/118980
§ 371 (c)(1),
(2) Date: May 23, 2022

(87) PCT Pub. No.: WO2021/103814
PCT Pub. Date: Jun. 3, 2021

(65) Prior Publication Data
US 2023/0009987 A1 Jan. 12, 2023

(30) Foreign Application Priority Data
Nov. 26, 2019 (CN) .......................... 201911171886.5

(51) Int. Cl.
*G01S 17/08* (2006.01)
*H04N 25/771* (2023.01)
(52) U.S. Cl.
CPC ............ *G01S 17/08* (2013.01); *H04N 25/771* (2023.01)

(58) Field of Classification Search
CPC ........ G01S 17/08; G01S 7/4861; G01S 7/481; H04N 5/37452; H04N 25/771; H04N 25/70
(Continued)

(56) References Cited

U.S. PATENT DOCUMENTS 10,468,439 B2 11/2019 Ikeda et al.
11,307,296 B2 4/2022 Nagai et al.
(Continued)

FOREIGN PATENT DOCUMENTS

CN 102484681 A 5/2012
CN 106449669 A 2/2017
(Continued)

OTHER PUBLICATIONS

International Search Report, China National Intellectual Property Administration, Application No. PCT/CN2020/118980, mailed Dec. 30, 2020, 6 pages.

*Primary Examiner* — Isam A Alsomiri
(74) *Attorney, Agent, or Firm* — Ziegler IP Law Group, LLC.

(57) ABSTRACT

A signal extraction circuit, a signal extraction method, and a distance measurement method and device. The distance measurement method comprises: performing multiple signal extractions using a circuit in a sensor, so as to obtain multiple extraction results; and determining the distance to a measurement object according to the multiple extraction results. Compared with pixel circuits in the prior art, the signal extraction circuit reduces the number of capacitors by half, thereby significantly increasing effective areas in pixels, and reducing calculation errors resulting from capacitance differences between the various capacitors. Moreover, part of the calculation is completed during the signal extraction, thus reducing the pressure of subsequent data processing, and particularly improving the accuracy and speed of (Continued)

distance measurement during the distance measurement process.

3 Claims, 6 Drawing Sheets

(58) Field of Classification Search
USPC ........................................................ 356/4.01
See application file for complete search history.

(56) References Cited

U.S. PATENT DOCUMENTS

| | | |
|---|---|---|
| 2010/0308209 A1 | 12/2010 | Buettgen et al. |
| 2014/0240692 A1 | 8/2014 | Tien et al. |
| 2019/0086521 A1 | 3/2019 | Boutaud et al. |
| 2020/0025894 A1 | 1/2020 | Dyck et al. |

FOREIGN PATENT DOCUMENTS

| | | |
|---|---|---|
| CN | 108780151 A | 11/2018 |
| CN | 108983249 A | 12/2018 |
| CN | 109791205 A | 5/2019 |
| CN | 110865383 A | 3/2020 |

Target 102

Light source 101

Lens 103

Image sensor 104

SIGNAL EXTRACTION CIRCUIT, SIGNAL EXTRACTION METHOD, AND DISTANCE MEASUREMENT METHOD AND DEVICE

CROSS REFERENCE TO RELATED APPLICATION

The present application is the national phase of PCT International Application No. PCT/CN2020/118980, which claims priority to Chinese Patent Application No. CN201911171886.5, titled "SIGNAL EXTRACTION CIR-CUIT, SIGNAL EXTRACTION METHOD, AND DIS-TANCE MEASUREMENT METHOD AND DEVICE", filed on Nov. 26, 2019 with the Chinese Patent Office, both of which are incorporated herein by reference in their entireties.

FIELD

The present disclosure relates to the field of microelec-tronic technologies, and in particular to a signal extraction circuit, a signal extraction method, a ranging method and a ranging apparatus.

BACKGROUND

This section is intended to provide a background or context for embodiments of the present disclosure that are recited in the claims. The descriptions herein are not admit-ted to describe the prior art by inclusion in this section.

In an imaging process of an image sensor, a signal received by a pixel of the image sensor inevitably contains a background light signal. However, in the imaging process, a useful signal is required to be separated from the back-ground light signal to obtain a required image or required detection information, especially in the field of Time of Flight (TOF) ranging. The TOF ranging is a process described as follows. A light pulse is continually transmitted to a target, and a light returned from the target after being reflected by the target is received by a sensor. The returned light includes an echo signal of the light pulse and an ambient light that is directly incident or reflected by the target. A distance to the to-be-measured target is obtained by detecting the flight (round-trip) time of the echo signal of the light pulse. In the TOF ranging, a large background light bring challenges to the requirement of high-precision rang-ing. In order to eliminate the interference of the background light, multiple capacitors are provided to respectively receive electrical charges converted by the signal including the echo signal and the background light, and receive the electrical charges converted by the signal including only the background light, and the echo signal is extracted by cal-culation. Due to the multiple capacitors, the area in the pixel is wasted on the one hand, and on the other hand the calculation error is caused by a capacitance difference between the different capacitors, which further results in the ranging error. In addition, the required data cannot be directly measured, and the large and fast data processing requirements in the entire array bring great pressure to the post-processing unit.

Therefore, it is desired to provide a signal extraction circuit, a signal extraction method, a ranging method and a ranging apparatus, to save the pixel area, and improve the ranging accuracy and the ranging speed.

SUMMARY

In the process of signal extraction and ranging in the conventional technology, the pixel circuit receiving the signal includes multiple capacitors for storing electrical charges generated in the signal extraction process. A capaci-tance of a capacitor is determined by properties of the capacitor itself. A large storage capacitance of the capacitor requires a large volume. In this case, a large number of capacitors results in a waste of the area in the pixel, and a capacitance difference between different capacitors results in a calculation error. In addition, in the conventional technol-ogy, data obtained by the signal extraction process is required to be transmitted to a post-processing unit for processing, which increases the data processing amount and wastes time.

Therefore, in the conventional technology, how to most effectively utilize the area in the pixel and reduce the data processing amount of post-processing is an urgent problem to be solved.

In view of this, it is urgently required to provide an improved signal extraction and ranging solution to solve the above disadvantages of the conventional technology.

In this context, there are provided a signal extraction circuit, a signal extraction method, a ranging method and a ranging apparatus according to embodiments of the present disclosure.

In a first aspect according to the embodiments of the present disclosure, a signal extraction circuit is provided. The signal extraction circuit includes at least one signal extraction module. The signal extraction module includes: at least one integrating unit, at least two charging branches and at least one power supply. The integrating unit is connected with the at least two charging branches, and the charging branches include:

a first charging branch in which a signal generating unit is connected with a first end of the integrating unit and a second end of the integrating unit is connected with the power supply, where the signal generating unit is configured to convert a received external signal into an electrical signal; and a second charging branch in which the signal generating unit is connected with the second end of the integrating unit and the first end of the integrating unit is connected with the power supply.

In an embodiment of the present disclosure, the charging branches include multiple switch units. In the first charging branch, the signal generating unit is connected with the first end of the integrating unit via a first switch unit (S1), and the second end of the integrating unit is connected with the power supply via a second switch unit (S2). In the second charging branch, the signal generating unit is connected with the second end of the integrating unit via a third switch unit (S3), and the first end of the integrating unit is connected with the power supply via a fourth switch unit (S4).

In another embodiment of the present disclosure, the switch units are connected with a demodulation module, and the demodulation module is configured to generate multiple demodulation signals to respectively control the charging branches to be turned on or turned off.

In another embodiment of the present disclosure, the demodulation signals have a preset phase relationship.

In another embodiment of the present disclosure, the at least one signal extraction module includes two signal extraction modules, and the demodulation module is con-figured to generate four demodulation signals including:

a first demodulation signal (D1) for controlling the first switch unit (S1) and the second switch unit (S2) in a first signal extraction module to be simultaneously turned on or turned off;

a second demodulation signal (D2) for controlling the third switch unit (S3) and the fourth switch unit (S4) in the first signal extraction module to be simultaneously turned on or turned off;

a third demodulation signal (D3) for controlling the first switch unit (S1) and the second switch unit (S2) in a second signal extraction module to be simultaneously turned on or turned off;

a fourth demodulation signal (D4) for controlling the third switch unit (S3) and the fourth switch unit (S4) in the second signal extraction module to be simultaneously turned on or turned off.

In a second aspect according to the embodiments of the present disclosure, a signal extraction method performed by the signal extraction circuit described above is provided. The method includes:

turning on the first charging branch and simultaneously turning off the second charging branch so that a signal from the signal generating unit is inputted to the first end of the integrating unit and is stored in the integrating unit;

turning on the second charging branch and simultaneously turning off the first charging branch so that a signal from the signal generating unit is inputted to the second end of the integrating unit and is stored in the integrating unit, where the first charging branch and the second charging branch are each turned on once in a charging cycle; and acquiring a result of the integrating unit obtained after at least one charging cycle as a signal extraction result.

In an embodiment of the present disclosure, the process of turning on the first charging branch and simultaneously turning off the second charging branch so that a signal from the signal generating unit is inputted to the first end of the integrating unit and is stored in the integrating unit includes: turning on the first switch unit (S1) and the second switch unit (S2) and simultaneously turning off the third switch unit (S3) and the fourth switch unit (S4), so that forward integration is performed on the signal from the signal generating unit in the integrating unit to obtain a forward integration result. The process of turning on the second charging branch and simultaneously turning off the first charging branch so that a signal from the signal generating unit is inputted to the second end of the integrating unit and is stored in the integrating unit includes: turning on the third switch unit (S3) and the fourth switch unit (S4) and simultaneously turning off the first switch unit (S1) and the second switch unit (S2), so that reverse integration is performed on the signal from the signal generating unit in the integrating unit. A difference between the forward integration and the reverse integration is acquired as the signal extraction result.

In another embodiment of the present disclosure, a demodulation module is connected with the multiple switch units, and the demodulation modules are configured to generate the multiple demodulation signals to respectively control the charging branches to be turned on or turned off.

In a third aspect according to the embodiments of the present disclosure, a ranging method performed by using the signal extraction circuit described above is provided. An emission light signal emitted from a light source is reflected by a to-be-measured target to obtain an echo signal, and the emission light signal has a pulse width ($T_C$), and the demodulation module generates four demodulation signals. The ranging method includes:

generating electrical charges by the signal generating unit based on a received background light signal having a preset duration and one part of the echo signal, and controlling the first charging branch of the first signal extraction module to be turned on by using a first demodulation signal (D1) so that the current electrical charges in the signal generating unit are transferred to the first end of the integrating unit in the first signal extraction module, where a first charge amount (Q1) of the electrical charges are transferred at the end of the transfer;

generating electrical charges by the signal generating unit based on the received background light signal having the preset duration, and controlling the second charging branch of the first signal extraction module to be turned on by using a second demodulation signal (D2) so that the current electrical charges in the signal generating unit are transferred to the second end of the integrating unit in the first signal extraction module, where a second charge amount (Q2) of the electrical charges are transferred at the end of the transfer;

obtaining a first signal extraction result ($\Delta$Q1) by the integrating unit in the first signal extraction module based on the first charge amount (Q1) and the second charge amount (Q2);

generating electrical charges by the signal generating unit based on the received background light signal having the preset duration and the other part of the echo signal, and controlling the first charging branch of the second signal extraction module to be turned on by using a third demodulation signal (D3), so that the current electrical charges in the signal generating unit are transferred to the first end of the integrating unit in the second signal extraction module, where a third charge amount (Q3) of the electrical charges are transferred at the end of the transfer;

generating electrical charges by the signal generating unit based on the received background light signal having preset duration, and controlling the second charging branch of the second signal extraction module to be turned on by using a fourth demodulation signal (D4) so that the current electrical charges in the signal generating unit are transferred to the second end of the integrating unit in the second signal extracting module, where a fourth charge amount (Q4) of electrical charges are transferred at the end of the transfer;

obtaining a second signal extraction result ($\Delta$Q2) by the integrating unit in the second signal extraction module based on the third charge amount (Q3) and the fourth charge amount (Q4); and calculating a distance between the light source and the to-be-measured target based on the first signal extraction result ($\Delta$Q1), the second signal extraction result ($\Delta$Q2) and the pulse width ($T_C$).

In an embodiment of the present disclosure, the signal generating unit is reset before receiving a signal each time, and the integrating unit is reset after obtaining the signal extraction result each time.

In another embodiment of the present disclosure, a falling edge of the first demodulation signal (D1) is aligned with a rising edge of the third demodulation signal (D3), and the second demodulation signal (D2) and the fourth demodulation signal (D4) do not overlap.

In a fourth aspect according to the embodiments of the present disclosure, a ranging apparatus including the signal extraction circuit described above. The ranging apparatus includes: an emitting module, a modulation module and a receiving module, where

5

6 the emitting module is configured to emit an emission light signal to obtain an echo signal reflected by a to-be-measured target;

the modulation module is configured to generate a modulation signal to modulate the emission light signal and demodulation signals; and the receiving module is configured to: receive the echo signal reflected by the target, perform signal demodulation based on the modulation signal, and determine a distance between an emitting end and the to-be-measured target based on a demodulation result, where the receiving module includes:

a photoelectric conversion device, configured to receive the echo signal and/or a background light and convert the received echo signal and/or background light signal into electrical charges;

the signal extraction circuit, configured to perform signal separation on the electrical charges based on different demodulation signals to obtain a signal extraction result;

an analog-to-digital conversion device, configured to convert the signal extraction result into a digital signal; and a data processing device, configured to calculate the distance between the ranging apparatus and the to-be-measured target based on the digital signal.

With the signal extraction circuit, the signal extraction method, the ranging method and the ranging apparatus according to the embodiments of the present disclosure, the number of the capacitors in the circuit is reduced by half. In this way, the area of the pixel is saved, so that the pixel can receive signals more effectively compared with the conventional technology. Further, the calculation error caused by the capacitance difference between the different capacitors is decreased, thereby reducing the ranging error. In addition, the influence of other undesired signals such as the background light, an interferential light source and a low-frequency noise can be eliminated. Furthermore, part of the calculation is completed during the charge transfer process with the technical solution in the present disclosure, reducing the data processing amount of the post-processing unit, improving the data processing speed, and saving a lot of time for distance calculation especially in the ranging process in which the measured data is required to be quickly fed back.

Overview of the Invention

It is found that, the signal is received only by two or four capacitors being paired in the signal extraction process in the conventional technology. In the case of the two capacitors, one capacitor is used to receive one part of an echo signal and a background light signal, and the other capacitor is used to receive the background light signal. The amount of electrical charges respectively stored in the two capacitors are each determined and are transmitted to the post-processing unit for calculation. A difference between the amount of electrical charges respectively stored in the two capacitors is calculated, to obtain the photo-generated charges generated by the part of the echo signal and achieve the signal extraction. The above process is repeated to calculate a phase difference of the echo signal relative to the emission light signal, and the distance to the target reflecting the echo signal is calculated. However, the solution in the conventional technology has the following disadvantages. The background light signal cancellation and the ranging are required to be performed by multiple capacitors, which wastes a large amount of pixel area. Further, the difference between the electrical charges respectively stored in the two capacitors is required to be calculated by the post-processing unit, which increases the data processing amount of the post-processing unit. In addition, when calculating the echo signal, that is, the effective signal, the error caused by the capacitance difference between different capacitors cannot be eliminated, and other undesired signals such as the low-frequency noise cannot be suppressed.

With the improvement of the pixel circuit in the present disclosure, the number of capacitors is reduced half under the same effect as that in the conventional technology, and the electrical charges stored in the capacitor is not required to be transmitted to the post-processing unit for difference calculation, so that the area in the pixel occupied by the capacitors can be reduced and the data processing amount of the post-processing unit can be reduced. In the technical solution of the present disclosure, the circuit including at least one capacitor is utilized to receive signals in the signal extraction process, the part of the echo signal and the background light signal that are received are inputted to the capacitor to perform forward integration in the capacitor, and the result of the forward integration is stored in the capacitor. The received background light signal is inputted to the capacitor to perform reverse integration in the capacitor. The difference between the forward integration result and the reverse integration result is stored, where the background light signal included in the forward integration is eliminated by the reverse integration, and the remaining part is only the part of the echo signal. The integral difference or signal extraction result stored in the capacitor is acquired, i.e., photo-generated charges generated by the part of the echo signal, which achieves the purpose of signal extraction. The above process is repeated so as to calculate the phase difference of the echo signal relative to the emission light signal, and calculate the distance to the target reflecting the echo signal.

In the signal extraction process, the circuit containing at least one capacitor is used to receive signals, the part of the echo signal and the background light signal that are received are inputted to one end of the capacitor and stored in the capacitor, and the received background light signal is inputted to the other end of the capacitor and stored in the capacitor. The signal extraction result stored in the capacitor is acquired, which is in fact the photo-generated charges generated by the part of the echo signal, to achieve the purpose of signal extraction. The above process is repeated to calculate the phase difference of the echo signal relative to the emission light signal, and calculate the distance to the target reflecting the echo signal.

The basic principle of the present disclosure has been explained described above, and various non-limiting embodiments of the present disclosure are described in detail below.

BRIEF DESCRIPTION OF THE DRAWINGS

The above and other objects, features and advantages of exemplary embodiments of the present disclosure become readily understood by reading the following detailed description with reference to the drawings. In the drawings, several embodiments of the present disclosure are shown by way of example and not limitation, in which.

In the drawings, the same or corresponding reference numerals denote the same or corresponding parts.

DETAILED DESCRIPTION OF EMBODIMENTS

Figure 1:
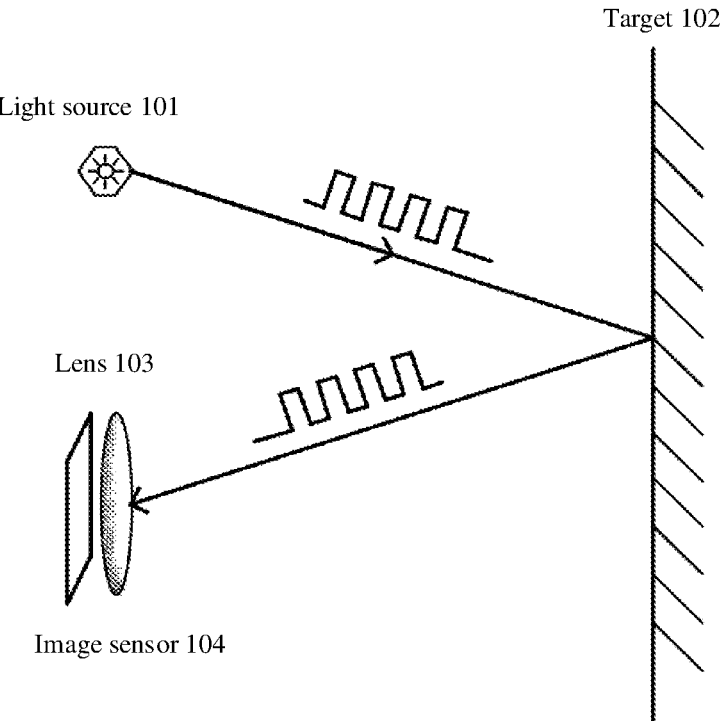
FIG. 1 is a schematic diagram showing a ranging scene in the conventional technology.

The principle and spirit of the present disclosure are described below with reference to several exemplary embodiments. It should be understood that these embodiments are given only for those skilled in the art to better understand and implement the present disclosure, but not to limit the scope of the present disclosure in any way. In addition, these embodiments are provided so that the present disclosure is thorough and complete and the scope of the disclosure is fully conveyed to those skilled in the art.

As appreciated by those skilled in the art, the embodiments of the present disclosure may be implemented as a system, an apparatus, a device, a method, or a computer program product. Accordingly, the present disclosure may be embodied in entirely hardware, entirely software (including firmware, resident software, and/or microcode, etc.), or a combination of hardware and software.

It should be understood that, although terms such as "first" and/or "second" may be used herein to describe various units, these units should not be limited by these terms. These terms are used only to distinguish one unit from another. For example, a first unit could be termed a second unit, and similarly a second unit could be termed a first unit, without departing from the scope of exemplary embodiments. As used herein, the term "and/or" includes any and all combinations of one or more of the associated listed items.

The terms used herein are only for the purpose of describing specific embodiments and are not intended to limit the exemplary embodiments. The singular forms "a" and/or "an" used herein are intended to include the plural unless the context clearly dictates otherwise. It should further be understood that the terms "comprising" and/or "including" used herein specify the presence of stated features, integers, steps, operations, units and/or components, but do not preclude the presence or addition of one or more other features, integers, steps, operations, units, components and/or combinations thereof.

A signal extraction circuit, a signal extraction method, a ranging method and a ranging apparatus are provided according to embodiments of the present disclosure. The method and the apparatus are proposed based on the same inventive concept. Since the principles of the method and the device for solving the problem are similar, implementations of the device and the method can be referred to each other, and the repetition is not repeated.

In recent years, research on 3D imaging systems has made great strides in order for autonomous driving to be applied in daily life. There are several requirements for the imaging system in autonomous driving: resistance to large background light (the strongest sunlight is 100 klux), high ranging accuracy and fast ranging. Therefore, a pixel circuit in the image sensor by which the waste of the area in the pixel can be reduced and a part of calculation can be completed during the operation of the circuit is needed to make the received signal more comprehensive, thereby improving the ranging accuracy, reducing the amount of subsequent data processing, saving data processing time, and quickly obtaining the distance to the target.

FIG. 1 is a diagram showing a general TOF ranging principle, in which a flight time between a sensor and a to-be-measured target is acquired by a phase difference between an emission light signal and an echo signal, to further obtain distance information. As shown in FIG. 1, an emission light signal is emitted from a light source 101. The emission light signal may be a laser pulse signal modulated by a pseudo-random sequence or an unmodulated laser pulse signal. The emission light signal is reflected by a target 102 and is focused on pixels of an image sensor 104 by a lens 103. A signal received by the image sensor includes an echo signal and a background light signal or only includes the background light signal, where it is assumed that the background light signal is uniform in a time period. A pixel circuit in the image sensor 104 is used to perform signal extraction on the received signal, to remove the background light signal and obtain a pure echo signal. Further, a phase difference of the echo signal in the returned light relative to the emission light signal is detected by each pixel, to determine a distance to a surrounding target.

Figure 2:
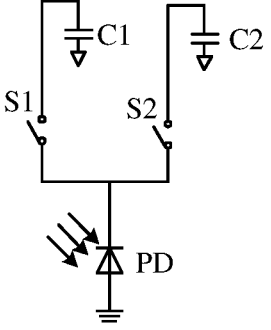
FIG. 2 schematically shows a 2-tap pixel circuit in an image sensor during ranging in the conventional technology.

FIG. 2 is a schematic diagram showing a conventional 2-tap pixel circuit in the image sensor 104 shown in FIG. 1. The pixel circuit includes a photodiode PD, a first capacitor unit C1, a second capacitor unit C2, a first switch unit S1 and a second switch unit S2. The photodiode PD is connected with the first capacitor unit C1 via the first switch unit S1, and is connected with the second capacitor unit C2 via the second switch unit S2. In a first stage, the switches S1 and S2 of the circuit shown in FIG. 2 are controlled by demodulation signals D1 and D2 shown in FIG. 4, where reference numerals Q1 and Q2 respectively indicate integration results of the echo signal and the background light signal in the first capacitor unit C1 and the second capacitor unit C2 obtained after the received signals are controlled by the switches S1 and S2 by means of the demodulation signals D1 and D2. The Q1 contains the background light signal and a part of the echo signal and, and the Q2 contains only the background light signal. The Q1 is converted into photo-generated charges by a photodiode and these photo-generated charges are stored in the first capacitor unit C1. The Q2 is converted into photo-generated charges by a photodiode PD and these photo-generated charges are stored in the other capacitor unit, i.e., the second capacitor unit C2. A capacity of the first capacitor unit is the same as that of the second capacitor unit. A difference operation is performed on the charges respectively stored in the first capacitor unit and the second capacitor unit (that is, voltages of the first capacitor unit and the second capacitor unit after the integration are subtracted), to calculate the amount of the photo-generated charges converted by the part of the echo signal in the Q1, thereby separating the echo signal from the background light signal so as to extract the echo signal. The first capacitor unit and the second capacitor unit are reset after the first stage ends. Next, in a second stage, the switches S1 and S2 of the circuit shown in FIG. 2 are controlled by the demodulation signals D3 and D4, where reference numerals Q3 and Q4 respectively indicate integration results of the echo signal and the background light signal in the first capacitor unit C1 and the second capacitor unit C2 obtained after the received signals are controlled by the switches S1 and S2 by means of the demodulation signals D3 and D4. The Q3 contains the background light signal and another part of the echo signal, and the Q4 contains only the background light signal. Photo-generated charges converted by the Q3 are stored in one of the capacitor units, and photo-generated charges converted by the Q4 are stored in the other capacitor unit. The phase difference of the echo signal relative to the emission light signal is calculated, to obtain the distance to the target reflecting the echo signal:

$$R = \frac{c \cdot T_c}{2} \cdot \frac{Q_3 - Q_4}{Q_1 - Q_2 + Q_3 - Q_4}$$

In the 2-tap pixel circuit, the operation of transmitting the light signal and receiving the signal is required to be performed once in each of the two stages, in other words, the operation of transmitting the light signal and receiving the signal is required to be performed twice in total, so that the distance to the target reflecting the echo signal can be calculated. It is assumed that, a time interval between first transmission of the light signal and second transmission of the light signal is short enough, pulse widths of the first transmission and the second transmission are the same, and echo delays thereof are also the same.

In the circuit of FIG. 2, a time-division multiplexing method is utilized to perform the capacitor integration and the difference calculation for each of the two stages. In this case, the measurement speed is relatively slow, while the number of used capacitors can be reduced, so that an area occupied by the pixel can be reduced.

Figure 3:
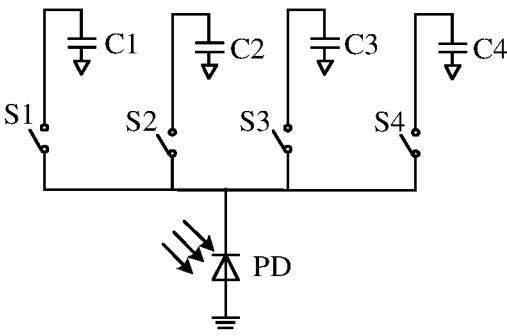
FIG. 3 schematically shows a 4-tap pixel circuit in an image sensor during ranging in the conventional technology.

FIG. 3 is a schematic diagram showing a conventional 4-tap pixel circuit in the image sensor 104 shown in FIG. 1.

The pixel circuit includes a photodiode PD, a first capacitor unit C1, a second capacitor unit C2, a third capacitor unit C3, a fourth capacitor unit C4, a first switch unit S1, a second switch unit S2, a third switch unit S3 and a fourth switch unit S4. The photodiode PD is connected with the first capacitor unit C1 via the first switch unit S1, and is connected with the second capacitor unit C2 via the second switch unit S2. Further, the photodiode PD is connected with the third capacitor unit C3 via the third switch unit S3, and is connected with the fourth capacitor unit C4 via the fourth switch unit S4. The four switch units in the circuit are controlled by demodulation signals D1, D2, D3 and D4 shown in FIG. 4, where reference numerals Q1, Q2, Q3 and Q4 respectively indicate integration results of the echo signal and the background light signal in the first capacitor unit C1, the second capacitor unit C2, the third capacitor unit C3 and the fourth capacitor unit C4 obtained after the received signals are controlled by the switches S1 S2, S3 and S4 by means of the demodulation signals D1, D2, D3 and D4. The Q1 contains the background light signal and a part of the echo signal, the Q3 contains the background light signal and another part of the echo signal, and the Q2 and the Q4 each contain only the background light signal. The Q1 is converted into photo-generated charges by the photodiode PD and these photo-generated charges are stored in one of the capacitors. The Q3 is converted into photo-generated charges by the photodiode PD and these photo-generated charges are stored in another capacitor, the Q2 and Q4 are respectively converted into photo-generated charges by the photodiode PD and these photo-generated charges are respectively stored in another two capacitors. A difference between the charges converted by the Q1 and stored in the capacitor and the photo-generated charges converted by the Q2 and stored in the corresponding capacitor is calculated, to calculate the amount of the photo-generated charges converted by the part of the echo signal in the Q1. A difference between the charges converted by the Q3 and stored in the capacitor and the photo-generated charges converted by the Q4 and stored in the corresponding capacitor is calculated, to calculate the amount of the photo-generated charges converted by the another part of the echo signal in the Q3. Next, the phase difference of the echo signal relative to the emission light signal is calculated, to obtain the distance to the target reflecting the echo signal:

$$R = \frac{c \cdot T_c}{2} \cdot \frac{Q_3 - Q_1}{Q_1 - Q_2 + Q_3 - Q_4}$$

In the 4-tap pixel circuit, the operation of transmitting the light signal and receiving the signal is required to be performed only once, so that the distance to the target reflecting the echo signal can be calculated. In this case, the calculation speed is faster than the solution of the 2-tap circuit, while the increased number of capacitors further occupy a limited area in the pixel.

A signal extraction circuit, a signal extraction method, a ranging method and a ranging apparatus are provided in the present disclosure, to save pixel area, improve ranging accuracy and ranging speed. In a ranging solution according to an embodiment of the present disclosure, a new pixel circuit is proposed, by which the number of the capacitors in the circuit is reduced by half and a part of the calculation is completed during the operation of the circuit compared with the circuit in the conventional technology, thereby increasing an effective area in the pixel and reducing the amount of subsequent data processing.

It should be understood that, the signal generating unit in the present disclosure may be provided by a PN type photodiode, or a photoelectric sensor such as a PIN type diode or a photoelectric triode. The integrating unit may be provided by a non-polar variable capacitor, a non-polar fixed capacitor, a polar capacitor, a mica capacitor, a monolithic capacitor, an electrolytic capacitor, a tantalum capacitor or other capacitors, or may be provided by another device for storing charges or electrical energies. Furthermore, any number of elements in the drawings is for illustration and not limitation, and any designation is for distinction only and does not have any limiting meaning.

Figure 5:
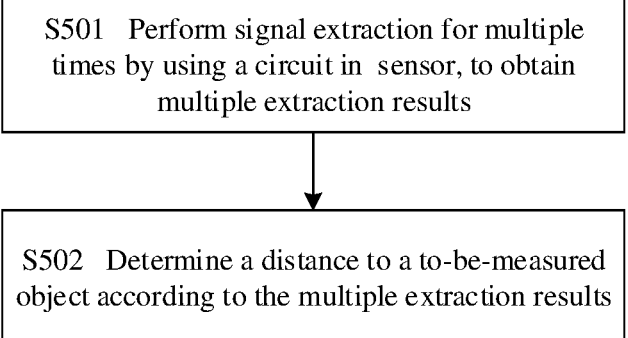
FIG. 5 schematically shows a flowchart of a method for performing ranging by using a signal extraction circuit according to an embodiment of the present disclosure.

In conjunction with the application scenario shown in FIG. 1, a signal extraction circuit, a signal extraction method, and a ranging method and a ranging apparatus are provided according to embodiments of the present disclosure. As shown in FIG. 5, the ranging method includes the following steps S501 and S502.

In S501, signal extraction is performed for multiple times by using the circuit in the sensor, to obtain multiple extraction results.

In S502, the distance to the to-be-measured target is determined according to the multiple extraction results.

Specific implementations of steps S501 and S502 are illustrated below by example.

Figure 6:
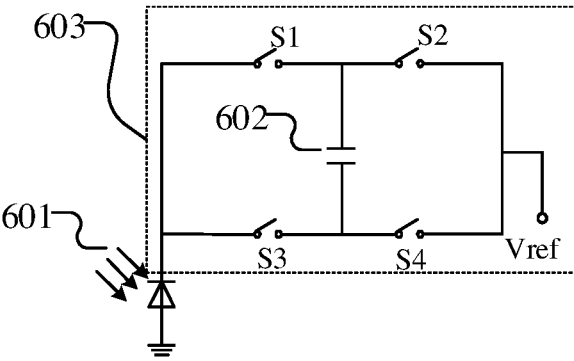
FIG. 6 schematically shows a signal extraction circuit for ranging according to an embodiment of the present disclosure.

The circuit in the embodiment of the present disclosure may be as shown in FIG. 6. The circuit includes at least one signal extraction module 603. The signal extraction module 603 includes: at least one integrating unit 602, at least two charging branches and at least one power supply.

Each integrating unit is connected to the at least two charging branches. The charging branches include: a first charging branch and a second charging branch.

In the first charging branch, a signal generating unit 601 is connected with a first end of the integrating unit 602, and a second end of the integrating unit 602 is connected with the power supply. The signal generating unit 601 is configured to convert a received external signal into an electrical signal.

In the second charging branch, the signal generating unit 601 is connected with the second end of the integrating unit 602, and the first end of the integrating unit 602 is connected with the power supply.

The signal generating unit 601 is connected with the two ends of the integrating unit 602 by the at least two charging branches, so that the integrating unit 602 has different integration modes. In this case, an electrical charge difference between the two charging branches in terms of the integration in the integrating unit 602 is obtained, so as to extract the difference signal. In the ranging application scenario, the difference signal corresponds to a useful echo signal with the background light being removed. Further, in the present disclosure, the useful signal can be extracted by means of only one integrating unit, which replaces the solution in the conventional technology that two integrating units are used to each perform receiving and transmitting to the outside of the pixel for calculation. In this way, the area of the pixel can be saved, avoiding an error caused by the difference of different integrating units, and further reducing the data processing amount of the post-processing unit by directly obtaining the difference signal.

Based on the above embodiments, each charging branch includes multiple switch units. In the first charging branch, the signal generating unit 601 is connected with the first end of the integrating unit 602 via a first switch unit S1, and the second end of the integrating unit 602 is connected with the power supply via a second switch unit S2. In the second charging branch, the signal generating unit 601 is connected with the second end of the integrating unit 602 via a third switch unit S3, and the first end of the integrating unit 602 is connected with the power supply via a fourth switch unit S4.

A signal extraction method performed by the signal extraction circuit shown in FIG. 6 is further provided according to an embodiment of the present disclosure. The first switch unit S1 and the second switch unit S2 are turned on and simultaneously the third switch unit S3 and the fourth switch unit S4 are turned off, that is, the first charging branch is turned on and simultaneously the second charging branch is turned off, so that a signal from the signal generating unit 601 is inputted to the first end of the integrating unit 602 and forward integration is performed in the integrating unit 602, and the result of the forward integration is stored in the integrating unit 602. Further, the third switch unit S3 and the fourth switch unit S4 are turned on and simultaneously the first switch unit S1 and the second switch unit S2 are turned off, that is, the second charging branch is turned on and simultaneously the first charging branch is turned off, so that a signal from the signal generating unit 601 is inputted to the second end of the integrating unit 602, and reverse integration is performed in the integrating unit 602, and the result of the reverse integration is stored in the integrating unit 602. A difference between the result of the forward integration and the result of the reverse integration is obtained as a result of the signal extraction. The first charging branch and the second charging branch are each turned on once in a charging cycle. A result of the integrating unit 602 obtained after at least one charging cycle is acquired as the signal extraction result.

Figure 4:
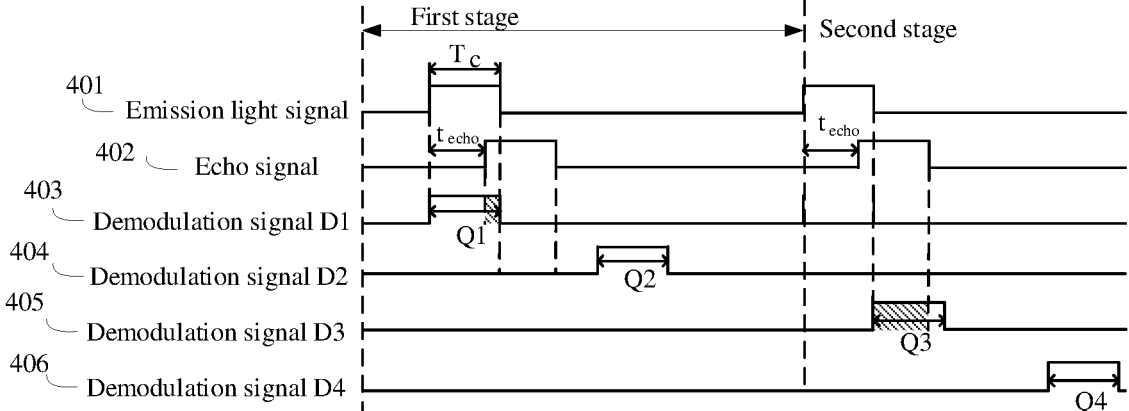
FIG. 4 is a schematic diagram showing a ranging waveform in the conventional technology.

The circuit in FIG. 6 is demodulated according to the demodulation mode of the demodulation signal as shown in FIG. 4. It should be noted that there are many types of demodulation signals and demodulation modes, which are not limited herein. The type of demodulation signal and the demodulation mode shown in FIG. 4 is just exemplary.

As shown in FIG. 6, the first switch unit S1 and the second switch unit S2 are controlled by a first demodulation signal 403 and/or a third demodulation signal 405, and the third switch unit S3 and the fourth switch unit S4 are controlled by a second demodulation signal 404 and/or a fourth demodulation signal 406. These demodulation signals have a preset phase relationship. Specifically, a falling edge of the first demodulation signal D1 is aligned with a rising edge of the third demodulation signal D3, and the second demodulation signal D2 and the fourth demodulation signal D4 do not overlap. It should be noted that the phase relationship includes but is not limited thereto.

It should be noted that, the integrating unit 602 is reset after obtaining the signal extraction result ΔQ, and the signal generating unit 601 is reset before receiving a signal each time.

The specific process of performing signal extraction by the signal extraction circuit 603 and further performing ranging based on the signal extraction result is described as follows.

Firstly, the demodulation is performed in the manner of the first stage shown in FIG. 4. The first switch unit S1 and the second switch unit S2 are turned on under the control of the first demodulation signal 403 and simultaneously the third switch unit S3 and the fourth switch unit S4 are turned off under the control of the second demodulation signal 404, that is, the first charging branch of the first signal extraction module 603 is turned on and simultaneously the second charging branch of the first signal extraction module 603 is turned off, and the signal generating unit 601 generates electrical charges based on a received background light signal having a preset duration and one part of the echo signal. The current electrical charges in the signal generating unit 601 are transferred to the first end of the integrating unit in the first signal extraction module 603, where the amount of transferred electrical charges at the end of the transfer is indicated by a first charge amount Q1. Further, the first switch unit S1 and the second switch unit S2 are turned off under the control of the first demodulation signal 403 and simultaneously the third switch unit S3 and the fourth switch unit S4 are turned on under the control of the second demodulation signal 404, that is, the second charging branch of the first signal extraction module 603 is turned on and simultaneously the first charging branch of the first signal extraction module 603 is turned off, and the signal generating unit 601 generates electrical charges based on the received background light signal having the preset duration. The current electrical charges in the signal generating unit 601 are transferred to the second end of the integrating unit 602 in the first signal extraction module 603, where the amount of transferred electrical charges at the end of the transfer is indicated by a second charge amount Q2. The integrating unit 602 in the first signal extraction module 603 obtains a first signal extraction result ΔQ1 based on the first charge amount Q1 and the second charge amount Q2. The signal extraction result ΔQ1 is a result obtained after one charging cycle of the integrating unit 602. After the one charging cycle, the interference of the background light signal is eliminated, and only the part of the echo signal that is left behind by the signal elimination is stored in the integrating unit 602. The part of the echo signal is received before the end of a current emission pulse of a light signal emitted by the light source and is an echo signal component returned after a front part of the current emission pulse of the light signal is reflected by the target.

A ratio of the echo signal component received before the end of the current emission pulse of the light signal emitted by the light source to an echo signal component received after the current emission pulse of the light signal emitted by the light source ends is calculated, and a delay time of the echo signal is calculated based on the ratio and a width $T_C$ of the current emission pulse of the light signal emitted by the light source. Next, the process of calculating the echo signal component received after the current emission pulse of the light signal emitted by the light source ends is described as follows.

The integrating unit 602 is reset after obtaining the signal extraction result ΔQ1.

Next, the circuit shown in FIG. 6 is demodulated in the demodulation manner of the demodulation signals in the second stage as shown in FIG. 4. The first switch unit S1 and the second switch unit S2 are controlled to be turned on under the control of the third demodulation signal 405 and simultaneously the third switch unit S3 and the fourth switch unit S4 are turned off under the control of the fourth demodulation signal 406, that is, the first charging branch of the first signal extraction module 603 is turned on and simultaneously the second charging branch of the first signal extraction module 603 is turned off, and the signal generating unit 601 generates electrical charges based on the received background light signal having the preset duration and the other part of the echo signal. The current electrical charges in the signal generating unit 601 are transferred to the first end of the integrating unit 602 in the first signal extraction module 603, where the amount of transferred electrical charges at the end of the transfer is indicated by a third charge amount Q3.

Further, the first switch unit S1 and the second switch unit S2 are turned off under the control of the third demodulation signal 405 and simultaneously the third switch unit S3 and the fourth switch unit S4 are turned on under the control of the fourth demodulation signal 406, that is, the second charging branch of the first signal extraction module 603 is turned on and simultaneously the first charging branch of the first signal extraction module 603 is turned off, and no echo signal is returned during a valid period of the fourth demodulation signal 406. In this case, the signal generating unit 601 receives only the background light signal. The signal generating unit 601 generates electrical charges based on the received background light signal having the preset duration. The current electrical charges in the signal generating unit 601 are transferred to the second end of the integrating unit 602 in the first signal extraction module 603, where the amount of transferred electrical charges at the end of the transfer is indicated by a fourth charge amount Q4. After one charging cycle, the interference of the background light signal is eliminated, and only the other part of the echo signal that is left behind by the signal elimination, i.e., the echo signal component received after the current emission pulse of the light signal emitted by the light source ends, is stored in the integrating unit 602. The integrating unit 602 in the first signal extraction module 603 obtains a second signal extraction result ΔQ2 based on the third charge amount Q3 and the fourth charge amount Q4. The distance between the light source and the to-be-measured target is calculated based on the first signal extraction result ΔQ1, the second signal extraction result ΔQ2 and the pulse width $T_C$. It should be noted that there is a phase difference between the demodulation signals. The integrating unit 602 is required to be reset every time a signal extraction result is obtained.

It is assumed that, the emission light signal emitted by the light source is reflected by the to-be-measured target to obtain an echo signal, the emission light signal has a pulse width $T_C$, and the echo signal has a time delay relative to the emission light signal, which is indicated by $t_{echo}$.

The delay time $t_{echo}$ of the echo signal is obtained by dividing the charge amount (Q3−Q4) corresponding to the other part of the echo signal by a sum of the charge amount (Q1−Q2) corresponding to the one part of the echo signal and the charge amount (Q3−Q4) corresponding to the other part of the echo signal and then multiplying the division result by the pulse width $T_C$ of the emission light signal, i.e., by dividing the second signal extraction result ΔQ2 by the sum of the first signal extraction result ΔQ1 and the second signal extraction result ΔQ2, and then multiplying the division result by the pulse width $T_C$ of the emission light signal:

$$t_{echo} = Tc * \frac{\Delta Q2}{\Delta Q1 + \Delta Q2} = Tc * \frac{(Q3 - Q4)}{(Q1 - Q2 + Q3 - Q4)}$$

The distance R to the to-be-measured target is obtained by multiplying the light speed c by a half of the delay time $t_{echo}$ of the echo signal:

$$R = \frac{c}{2} t_{echo}$$

For example, assuming that the distance between the to-be-measured target and the emission light source is approximately 300 m, it can be seen from the above formula that the delay time of the echo signal is about 2000 ns. The pulse width of the emission light signal should be set to be greater than the delay time of the echo signal, so that there is an overlap between a pulse of the emission light signal and a pulse of the echo signal. That is, the pulse width of the emission light signal should be greater than 2000 ns, preferably 3000 ns to 5000 ns.

The above embodiments of the present disclosure have the following advantages. The signal extraction is achieved by performing forward integration once and reverse integration once on the circuit having one integrating unit 602, i.e., in one charging cycle, and the distance to the to-be-measured target is calculated by performing forward integration twice and reverse integration twice, where the integrating unit 602 may be implemented by a capacitor. Compared with the 2-tap pixel circuit in the conventional technology, the number of the capacitors in the circuit is reduced by half with the technical solution according to the embodiments of the present disclosure, so that the available effective area in the pixel is increased. Further, due to only one capacitor, there is no problem of capacitance mismatch, so that the error can be reduced. The value stored in the integrating unit 602 is acquired as the signal extraction result, which is equivalent to a result by subtracting the electrical charges respectively generated by the two integrations in the conventional technology. Therefore, there is no need to transmit the data to the post-processing unit for data processing, reducing the data processing amount of the post-processing unit. Further, the maximum capacity of the integrating unit 602 is only required to store the electrical charges generated by one integration, so that the required capacity of the integrating unit 602 is reduced, and the occupied area of the integrating unit is also reduced accordingly, which further saves the area in the pixel.

In addition, the at least two charging branches are provided to charge the integrating unit under the control of the demodulation signals, i.e., perform integration on the electrical signal. In this case, each signal extraction module can be regarded as a convolution module to realize a convolution operation function. In the convolution process, a time difference between the forward integration and the reverse integration is on the order of microseconds or even nanoseconds. Therefore, the noise of the forward integration and the noise of the reverse integration can be considered to have the same distribution. In this case, a mean of the noise in the forward integration and a mean of the noise in the reverse integration are the same and cancel with each other when calculating the difference, so that the extracted signal has a good suppressing effect on the noise, which is derived as follows.

It is assumed that, the forward integration is performed in a time period [t1, t2], and a signal acquired in this process is represented as:

$$x(t_1), x(t_2), \ldots, x(t_N)$$

The reverse integration is performed in a time period [t3, t4], and a signal acquired in this process is represented as:

$$y(s_1), y(s_2), \ldots, y(s_N)$$

The signals in the above two processes are respectively expressed as:

$$x(t)=a(t)+\varepsilon(t), y(t)=b(t)+\varepsilon(t)$$

$$\varepsilon(t) \sim N(f(t), \sigma^2)$$

where a(t) and b(t) respectively represent the signals in the forward integration process and the reverse integration process, and $\varepsilon(t)$ represents a noise in the integration process, and the noise obeys a normal distribution with a mean of f(t) and a variance of $\sigma^2$.

After the forward integration and the reverse integration, an electrical signal stored in the integrating unit may be expressed as:

$$\sum_{i=1}^{N} x(t_i) - \sum_{j=1}^{N} y(s_j) = \sum_{i=1}^{N} a(t_i) - \sum_{j=1}^{N} b(s_j) + \sum_{i=1}^{N} \varepsilon(t_i) - \sum_{j=1}^{N} \varepsilon(s_j)$$

Since it is considered that $\varepsilon(t_1)$, $\varepsilon(t_2)$, . . . , $\varepsilon(t_N)$, $\varepsilon(s_1)$, $\varepsilon(s_2)$, . . . , and $\varepsilon(s_N)$ all obey the same distribution in a short time period, that is, the means thereof are the same. In this case, the following formula is obtained:

$$\left[ \sum_{i=1}^{N} \varepsilon(t_i) - \sum_{1=1}^{N} \varepsilon(s_j) \right] \sim N(0, 2N\sigma^2)$$

That is, after the forward integration and the reverse integration, the noise in the integrating unit obeys a normal distribution with a mean of zero and a variance of $2N\sigma^2$. It can be seen that the noise is well suppressed and controlled to fluctuate around 0.

Figure 8:
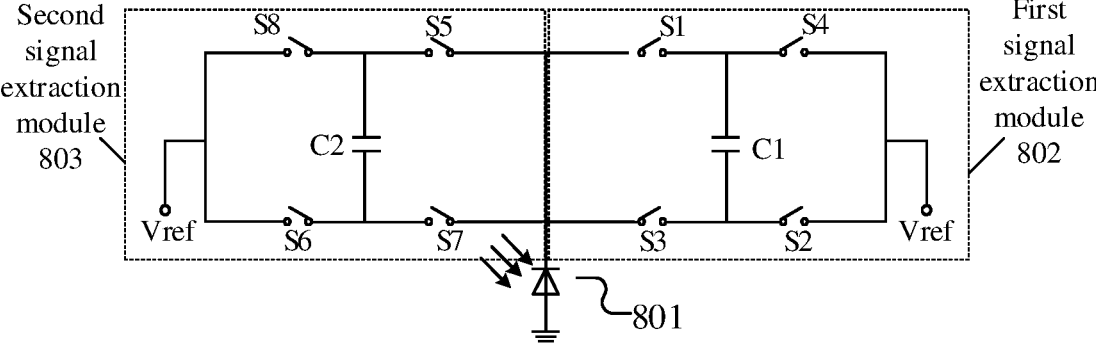
FIG. 8 schematically shows a signal extraction circuit for ranging according to another embodiment of the present disclosure.

FIG. 8 shows a circuit according to another embodiment of the present disclosure. The extraction circuit may include two signal extraction modules, i.e., a first signal extraction module 802 and a second signal extraction module 803. The first signal extraction module 802 is the same as the signal extraction module 603 shown in FIG. 6. The second signal extraction module includes: a fifth switch unit S5, a sixth switch unit S6, a seventh switch unit S7, an eighth switch unit S8, and a second integrating unit C2. The fifth switch unit S5 and the sixth switch unit S6 herein respectively correspond to the first switch unit S1 and the second switch unit S2 in the second signal extraction module, and the seventh switch unit S7 and the eighth switch unit S8 herein respectively correspond to the third switch unit S3 and the fourth switch unit S4 in the second signal extraction module. The connection in the signal extraction circuit is described as follows. In the first charging branch of the first extraction module 802, the signal generating unit 801 is connected with the first end of the first integrating unit C1 via the first switch unit S1, and the second end of the first integrating unit C1 is connected with the power supply via the second switch unit S2. In the second charging branch of the first extraction module 802, the signal generating unit 801 is connected with the second end of the first integrating unit C1 via the third switch unit S3, and the first end of the first integrating unit C1 is connected with the power supply via the fourth switch unit S4.

In the first charging branch of the second extraction module 803, the signal generating unit 801 is connected with a first end of the second integrating unit C2 via the fifth switch unit S5, and a second end of the second integrating unit C2 is connected with the power supply via the sixth switch unit S6. In the second charging branch of the second extraction module 803, the signal generating unit 801 is connected with the second end of the second integrating unit C2 via the seventh switch unit S7, and the first end of the second integrating unit C2 is connected with the power supply via the eighth switch unit S8.

A signal extraction method performed by the signal extraction circuit shown in FIG. 8 is further provided according to an embodiment of the present disclosure. The first switch unit S1 and the second switch unit S2 are turned on and simultaneously other switch units are turned off, that is, the first charging branch of the first extraction module 802 is turned on and simultaneously other charging branches are turned off, so that a signal generated from the signal generating unit 801 is inputted to the first end of the first integrating unit C1 and forward integration is performed in the first integrating unit C1, and the result of the forward integration is stored in the first integrating unit C1. Further, the first switch unit S1 and the second switch unit S2 are turned off, the fifth switch unit S5 and the sixth switch unit S6 are turned on, and simultaneously other switch units are turned off, that is, the first charging branch of the first extraction module 802 is turned off, the first charging branch of the second extraction module 803 is turned on, and simultaneously other charging branches are turned off, so that a signal from the signal generating unit 801 is inputted to the first end of the second integrating unit C2, and the forward integration is performed in the second integrating unit C2, and the result of the forward integration is stored in the second integrating unit C2. The third switch unit S3 and the fourth switch unit S4 are turned on and simultaneously other switch units are turned off, that is, the second charging branch of the first extraction module 802 is turned on, and other charging branches are turned off, so that the signal from the signal generating unit 801 is inputted to the second end of the first integrating unit C1, and reverse integration is performed in the first integrating unit C1, and a difference between the result of the forward integration and the result of the reverse integration in the first integrating unit is stored in the first integrating unit C1. Furthermore, the third switch unit S3 and the fourth switch unit S4 are turned off, the seventh switch unit S7 and the eighth switch units S8 are turned on and simultaneously other switch units are turned off, that is, the second charging branch of the first extraction module 802 is turned off, the second charging branch of the second extraction module 803 is turned on and simultaneously other charging branches are turned off, a signal from the signal generating unit 801 is inputted to the second end of the second integrating unit C2, the reverse integration is performed in the second integrating unit C2, and a difference between the result of the forward integration and the result of the reverse integration in the second integrating unit is stored in the second unit C2. The difference between the result of the forward integration and the result of the reverse integration stored in the integrating unit C1 and the difference between the result of the forward integration and the result of the reverse integration stored in the second integrating unit C2 are acquired as a signal extraction result.

Figure 7:
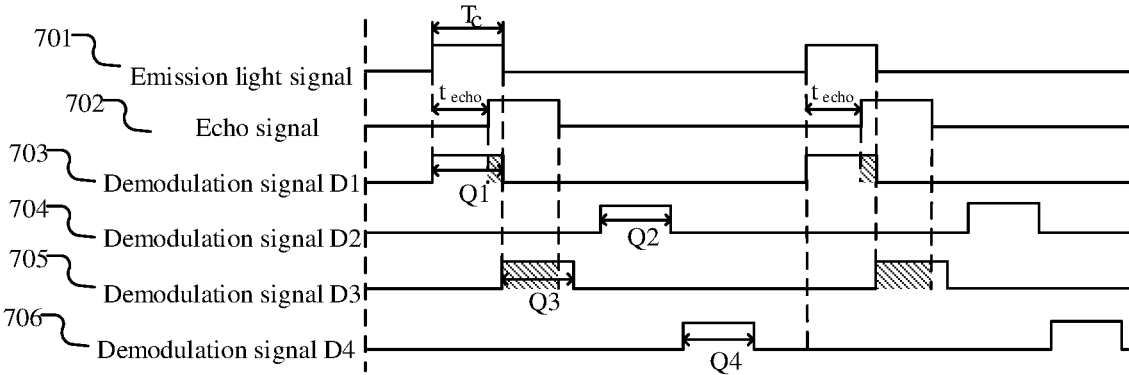
FIG. 7 is a schematic diagram showing a ranging waveform according to an embodiment of the present disclosure.

The circuit in FIG. 8 is demodulated according to the demodulation mode of the demodulation signal as shown in FIG. 7. The first switch unit S1 and the second switch unit S2 are controlled by the first demodulation signal 703. The third switch unit S3 and the fourth switch unit S4 is controlled by the second demodulation signal 704. The fifth switch unit S5 and the sixth switch unit S6 are controlled by the third modulation signal 705. The seventh switch unit S7 and the eighth switch unit S8 are controlled by the fourth demodulation signal 706. There is a phase difference between the demodulation signals.

In FIG. 7, the demodulation signal has the same pulse width as the emission light signal, the delay of the echo signal is smaller than the pulse width of the emission light signal, and the first demodulation signal 703 has the same phase as the emission light signal. The first demodulation signal 703 is used to control the circuit to receive one part of the echo signal and the background light signal, where the part of the echo signal is received before the end of a current emission pulse of a light signal emitted by the light source and is an echo signal component returned after a front part of the current emission pulse of the light signal is reflected by the target. A falling edge of the first demodulation signal 703 is aligned with a rising edge of the third demodulation signal 705, so as to accurately separate the echo signal component received before the end of the current emission pulse of the light signal from the echo signal component that is received after the current emission pulse of the light signal ends and returned after the current emission pulse of the light signal is reflected by the target. The third demodulation signal 705 is used to control the circuit to receive the other part of the echo signal and the background light signal, where the other part of the echo signal is the echo signal component received after the current emission pulse of the light signal emitted by the light source ends. The second demodulation signal 704 is delayed from the first demodulation signal 703 by at least two pulse widths. The fourth demodulation signal 706 is delayed from the first demodulation signal 703 by at least three pulse widths of the emission light signal. There is no overlap between the second demodulation signal 704 and the fourth demodulation signal 706. It can be seen that both the second demodulation signal 704 and the fourth demodulation signal 706 receive only the background light signal. That is, no echo signal component is returned when the second demodulation signal 704 and the fourth demodulation signal 706 each are valid, there is no return, and thus only the background light is received.

It should be noted that, the corresponding integrating unit C1 or C2 is reset after obtaining the signal extraction result ΔQ, and the signal generating unit 801 is reset before receiving a signal each time.

The specific process of performing signal extraction by the above signal extraction circuit and further performing ranging based on the signal extraction result is described as follows.

Firstly, the first switch unit S1 and the second switch unit S2 are turned on under the control of the first demodulation signal 703, the third switch unit S3 and the fourth switch unit S4 are turned off under the control of the second demodulation signal 704, the fifth switch unit S5 and the sixth switch unit S6 are turned off under the control of the third demodulation signal 705, and simultaneously the seventh switch unit S7 and the eighth switch unit S8 are turned off under the control of the fourth demodulation signal 706, so that the signal generating unit 801 generates electrical charges based on a received background light signal having a preset duration and one part of the echo signal. The current electrical charges in the signal generating unit 801 are transferred to the first end of the first integrating unit C1 in the first signal extraction module 802, where the amount of transferred electrical charges at the end of the transfer is indicated by a first charge amount Q1.

Further, the first switch unit S1 and the second switch unit S2 are turned off under the control of the first demodulation signal 703, the fifth switch unit S5 and the sixth switch unit S6 are turned on under the control of the third demodulation signal 705, the third switch unit S3 and the fourth switch unit S4 are turned off under the control of the second modulation signal 704, and simultaneously the seventh switch unit S7 and the eighth switch unit S8 are turned off under the control of the fourth demodulation signal 706, so that the signal generating unit 801 generates electrical charges based on the received background light signal having the preset duration and the other part of the echo signal. The current electrical charges in the signal generating unit 801 are transferred to the first end of the second integrating unit C2 in the second signal extraction module 803, where the amount of transferred electrical charges at the end of the transfer is indicated by a third charge amount Q3.

Furthermore, the third switch unit S3 and the fourth switch unit S4 are turned on under the control of the second demodulation signal 704, the first switch unit S1 and the second switch unit S2 are turned off under the control of the first demodulation signal 703, the fifth switch unit S5 and the sixth switch unit S6 are turned off under the control of the third modulation signal 705, and simultaneously the seventh switch unit S7 and the eighth switch unit S8 are turned off under the control of the fourth demodulation signal 706, so that the signal generating unit 801 generates electrical charges based on the received background light signal having the preset duration. The current electrical charges in the signal generating unit 801 are transferred to the second end of the first integrating unit C1 in the first signal extraction module 802, where the amount of transferred electrical charges at the end of the transfer is indicated by a second charge amount Q2. The first integrating unit C1 in the first signal extraction module 802 obtains a first signal extraction result ΔQ1 (ΔQ1=Q1–Q2) based on the first charge amount Q1 and the second charge amount Q2. After one charging cycle of the first integrating unit C1, that is, after one forward integration and one reverse integration, the interference of the background light signal is eliminated, and only the part of the echo signal that is left behind by the signal elimination is stored in the first integrating unit C1.

Further, the seventh switch unit S7 and the eighth switch unit S8 are turned on under the control of the fourth demodulation signal 706, the first switch unit S1 and the second switch unit S2 are turned off under the control of the first demodulation signal 703, the third switch unit S3 and the fourth switch unit S4 are turned off under the control of the second demodulation signal 704, and simultaneously the fifth switch unit S5 and the sixth switch unit S6 are turned off under the control of the third demodulation signal 705, so that the signal generating unit 801 generates electrical charges based on the received background light signal having the preset duration. The current electrical charges in the signal generating unit 801 are transferred to the second end of the second integrating unit C2 in the second signal extraction module 803, where the amount of transferred electrical charges at the end of the transfer is indicated by a fourth charge amount Q4. The second integrating unit C2 in the second signal extraction module 803 obtains a second signal extraction result ΔQ2 (ΔQ2=Q3–Q4) based on the third charge amount Q3 and the fourth charge amount Q4. After one charging cycle of the second integrating unit C2, that is, after one forward integration and one reverse integration, the interference of the background light signal is eliminated, and only the other part of the echo signal that is left behind by the signal elimination is stored in the second integrating unit C2. It should be noted that there is a phase difference between the demodulation signals. The integrating unit is required to be reset every time the signal extraction result is obtained.

It is assumed that, the emission light signal emitted by the light source is reflected by the to-be-measured target to obtain an echo signal, the emission light signal has a pulse width $T_C$, and the echo signal has a time delay relative to the emission light signal, which is indicated by $t_{echo}$.

The delay time $t_{echo}$ of the echo signal is obtained by dividing the charge amount (Q3–Q4) corresponding to the other part of the echo signal by a sum of the charge amount (Q1–Q2) corresponding to the one part of the echo signal and the charge amount (Q3–Q4) corresponding to the other part of the echo signal and then multiplying the division result by the pulse width $T_C$ of the emission light signal, i.e., by dividing the second signal extraction result ΔQ2 by the sum of the first signal extraction result ΔQ1 and the second signal extraction result ΔQ2, and then multiplying the division result by the pulse width $T_C$ of the emission light signal:

$$t_{echo} = Tc * \frac{\Delta Q2}{\Delta Q1 + \Delta Q2} = Tc * \frac{(Q3 - Q4)}{(Q1 - Q2 + Q3 - Q4)}$$

The distance R to the to-be-measured target is obtained by multiplying the light speed c by a half of the delay time $t_{echo}$ of the echo signal:

$$R = \frac{c}{2} t_{echo}$$

The above embodiments of the present disclosure have the following advantages. The distance to the to-be-measured target can be calculated by performing forward integration once and reverse integration once using a circuit having two integrating units. The integrating unit may be implemented by a capacitor. Compared with the 4-tap pixel circuit in the conventional technology, the number of the capacitors in the circuit is reduced by half with the technical solution according to the embodiments of the present disclosure, so that the usable area in the pixel is increased, and the data processing amount of the post-processing unit is reduced. In addition, since there exists a capacitance difference between the two capacitors, the calculation error exists but is much smaller than that in the technical solution of the 4-tap pixel circuit with four capacitors.

Figure 9:
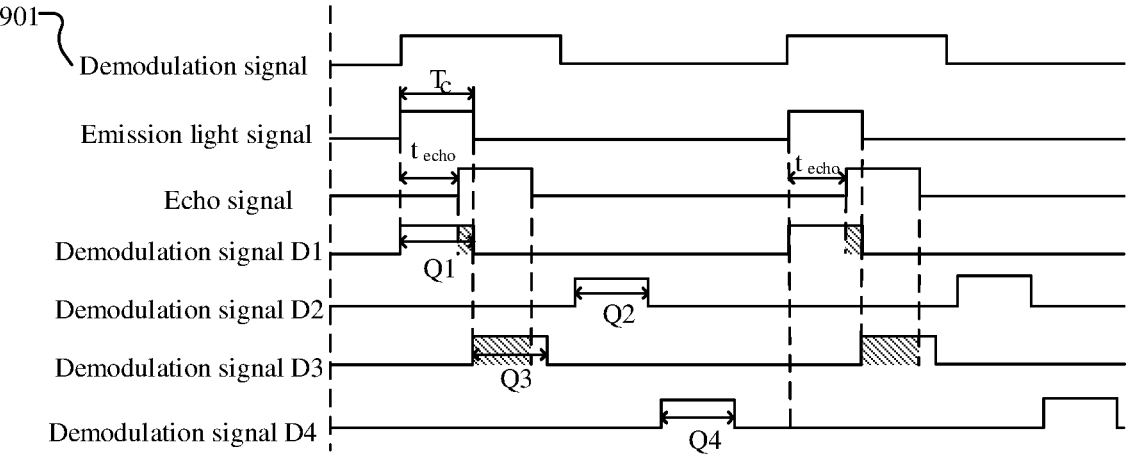
FIG. 9 is a schematic diagram showing a ranging waveform with modulation of a modulation signal according to an embodiment of the present disclosure.
Figure 10:
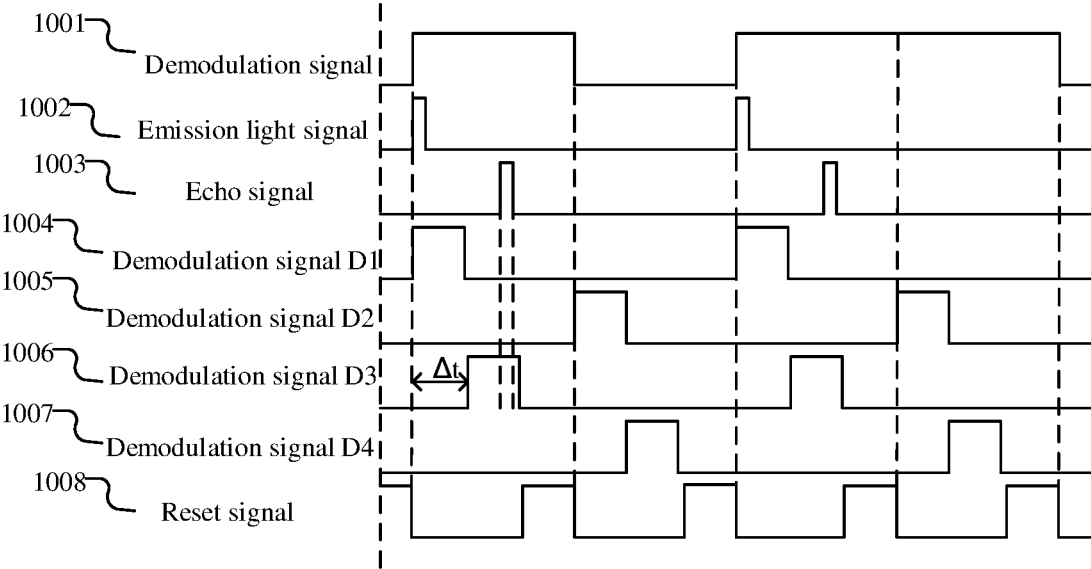
FIG. 10 is a schematic diagram showing a ranging waveform in a first stage in a case that a pseudo-random sequence serves as the modulation signal according to the embodiment of the present disclosure.

The emission light signal and the multiple demodulation signals in the embodiments of the present disclosure may be modulated by a modulation signal 901, as shown in FIG. 9. The modulation signal 901 may be implemented by a pseudo-random sequence, which is a deterministic sequence with some random properties. The deterministic sequence is generated by a shift register but has some random properties. As shown in FIG. 10, the pseudo-random sequence is used to modulate the emission light signal 1002, a first demodulation signal 1004, a second demodulation signal 1005, a third demodulation signal 1006, a fourth demodulation signal 1007 and a reset signal 1008 to track an echo signal 1003, with reference to FIG. 10 to FIG. 13. It should be noted that, the modulation signals 1001 in FIG. 10 to FIG. 13 are the same, the emission light signals 1002 in FIG. 10 to FIG. 13 are the same, and the echo signals 1003 in FIG. 10 to FIG. 13 are the same. In a case that the reset signal is valid, the demodulation signal is invalid. In addition, in a case that the demodulation signal is valid, the reset signal is invalid. It is assumed that the first demodulation signal 1004, the second demodulation signal 1005, the third demodulation signal 1006 and the fourth demodulation signal 1007 have the same pulse width as a current pulse width $T_S$. The first signal extraction result ΔQ1 is compared with the second signal extraction result ΔQ2 to obtain a larger value. A time between a rising edge of the first demodulation signal 1004 or the third demodulation signal 1006 corresponding to the larger value and a transmission starting point of the modulation signal is determined as a time delay of a transmission starting point of the demodulation signal, and the pulse width of the demodulation signal is reduced to ½ of the current pulse width. The reduced pulse width of the demodulation signal is determined as the current pulse width, and the above process is repeated until the pulse width of the demodulation signal is equal to a set threshold. In this case, the corresponding first signal extraction result $\Delta Q1$ and the corresponding second signal extraction result $\Delta Q2$ are acquired to calculate the distance between the light source and the to-be-measured target, where the set threshold is ½ of the pulse width $T_C$ of the emission light signal.

The following specific embodiment is described.

The first signal extraction result $\Delta Q1$ and the second signal extraction result $\Delta Q2$ are acquired by using the signal extraction method by the signal extraction circuit, and magnitudes of the first signal extraction result $\Delta Q1$ and the second signal extraction result $\Delta Q2$ are compared. If the comparison result is as shown in FIG. 10, the second signal extraction result $\Delta Q2$ is a larger value, and the time difference between the rising edge of the third demodulation signal 1006 and the transmission starting point of the modulation signal is determined as the time delay $\Delta t$. It is determined whether a current pulse width $T_S$ of the demodulation signal is equal to the set threshold. If the current pulse width $T_S$ of the demodulation signal is equal to the set threshold, the distance between the light source and the to-be-measured target is calculated by the ranging method. In addition, if the current pulse width does not reach the threshold, the pulse width of the third demodulation signal 1006 is reduced to ½ of the current pulse width. The reduced pulse width of the demodulation signal is determined as the current pulse width $T_S$. It should be noted that, the threshold in this embodiment is set to be half of the pulse width $T_C$ of the emission light signal. For example, the pulse width of the emission light signal is set as 100 ns, the current pulse width of the demodulation signal is set as 400 ns, and the set threshold is set as 50 ns, which is half of the pulse width of the emission light signal. In this case, the pulse width of the demodulation signal is not equal to the set threshold, and the current pulse width of the demodulation signal is reduced by half, at this time the current pulse width of the demodulation signal is equal to 200 ns.

Figure 11:
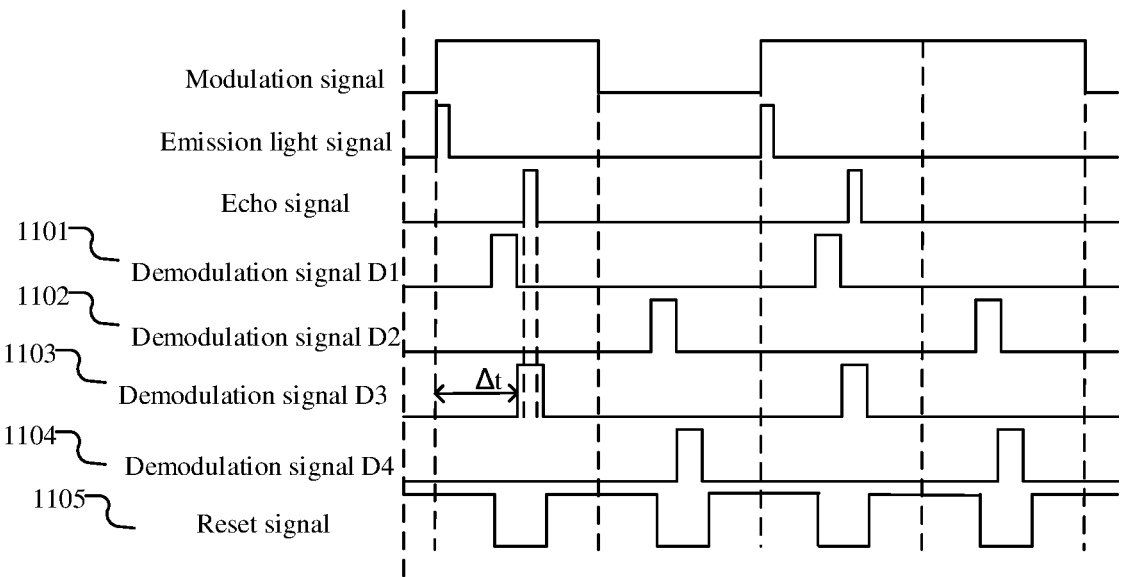
FIG. 11 is a schematic diagram showing a ranging waveform in a second stage in the case that the pseudo-random sequence serves as the modulation signal according to the embodiment of the present disclosure.

As shown in FIG. 11, the time delay $\Delta t$ is determined as the phase shift of the demodulation signals 1101 to 1104. The first signal extraction result $\Delta Q1$ and the second signal extraction result $\Delta Q2$ are acquired by using the signal extraction method by the signal extraction circuit, and magnitudes of the first signal extraction result $\Delta Q1$ and the second signal extraction result $\Delta Q2$ are compared. It can be seen from FIG. 11 that the second signal extraction result $\Delta Q2$ is still a larger value, and the time difference between the rising edge of the third demodulation signal 1003 and the transmission starting point of the modulation signal is determined as the time delay $\Delta t$. In this case, the current pulse width $T_S$ does not reach the set threshold, and the pulse width of the third demodulation signal 1103 is reduced to ½ of the current pulse width. The reduced pulse width of the demodulation signal is determined as the current pulse width $T_S$, and the following steps are performed. Following the above example, the current pulse width of the demodulation signal is still not equal to the set threshold, and the current pulse width of the demodulation signal is still reduced by half, at this time the current pulse width of the demodulation signal is equal to 100 ns.

Figure 12:
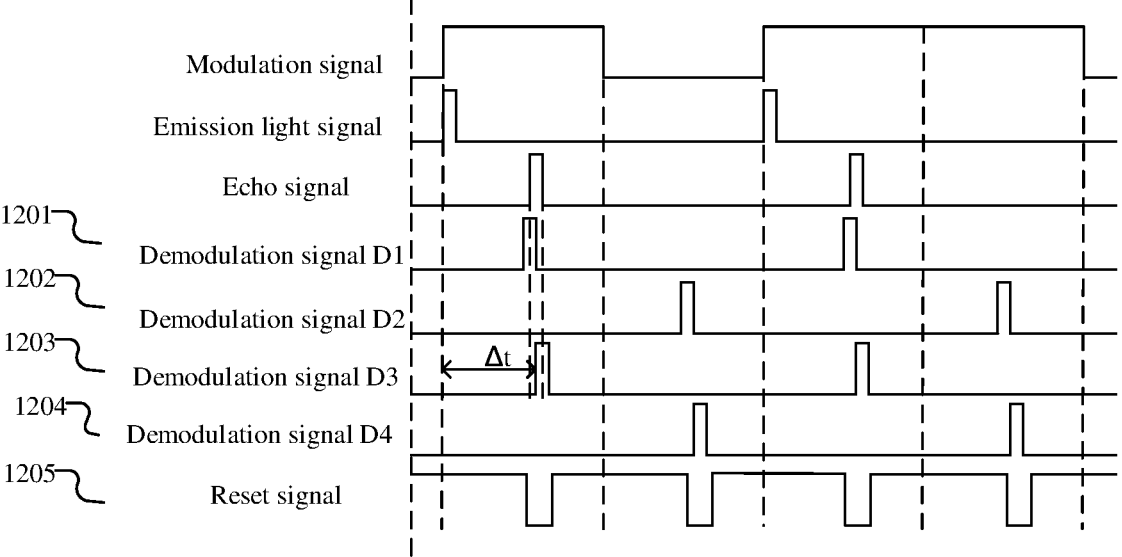
FIG. 12 is a schematic diagram showing a ranging waveform in a third stage in the case that the pseudo-random sequence serves as the modulation signal according to the embodiment of the present disclosure.

As shown in FIG. 12, the time delay $\Delta t$ is determined as the phase shift of the demodulation signals 1201 to 1204. The first signal extraction result $\Delta Q1$ and the second signal extraction result $\Delta Q2$ are acquired by using the signal extraction method by the signal extraction circuit, and magnitudes of the first signal extraction result $\Delta Q1$ and the second signal extraction result $\Delta Q2$ are compared. It can be seen from FIG. 12 that the second signal extraction result $\Delta Q2$ is still a larger value, and the time difference between the rising edge of the third demodulation signal 1203 and the transmission starting point of the modulation signal is determined as the time delay $\Delta t$. In this case, the pulse width $T_S$ does not reach the set threshold, and the pulse width of the third demodulation signal 1203 is reduced to ½ of the current pulse width. The reduced pulse width of the demodulation signal is determined as the current pulse width $T_S$. Following the above example, the current pulse width of the demodulation signal is still not equal to the set threshold, the current pulse width of the demodulation signal is still reduced by half, at this time the current pulse width of the demodulation signal is equal to 50 ns.

Figure 13:
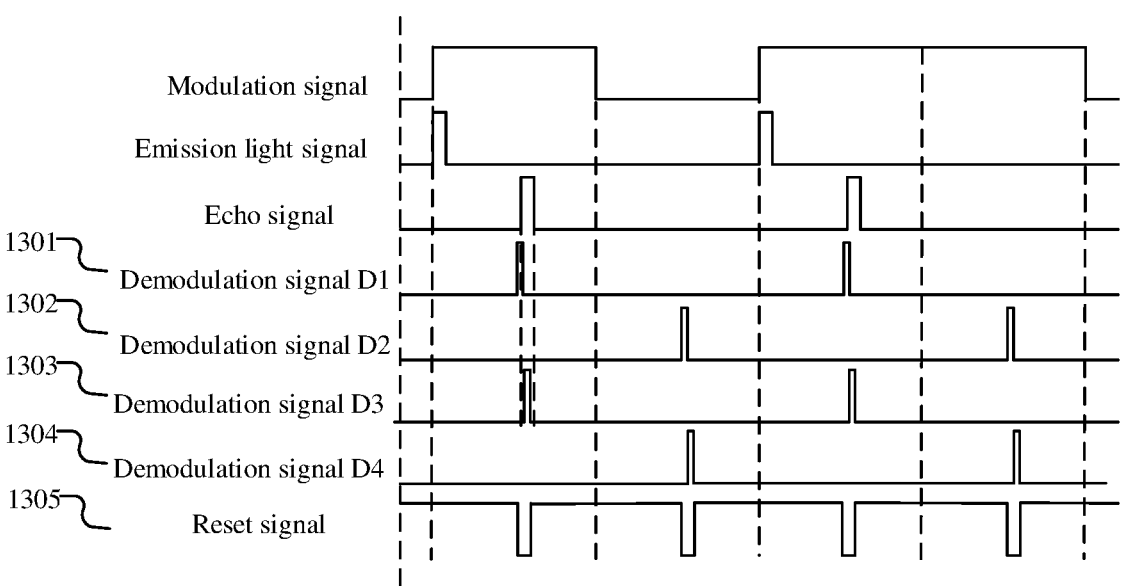
FIG. 13 is a schematic diagram showing a ranging waveform of accurately determining the echo signal in the case that the pseudo-random sequence serves as the modulation signal according to the embodiment of the present disclosure.

As shown in FIG. 13, the time delay $\Delta t$ is determined as the phase shift of the demodulation signals 1301 to 1304. In this case, the current pulse width of the demodulation signal reaches the set threshold, i.e., half of the pulse width of the emission light signal. The first signal extraction result $\Delta Q1$ and the second signal extraction result $\Delta Q2$ are acquired by using the signal extraction method by the signal extraction circuit, and the distance between the light source and the to-be-measured target is calculated by the ranging method utilizing the signal extraction method performed by the signal extraction circuit. Following the above example, the current pulse width of the demodulation signal is equal to the set threshold, i.e., half of the pulse width of the emission light signal, which is equal to 50 ns. In this case, the distance between the light source and the to-be-measured target can be calculated in accordance with the current demodulation manner of the demodulation signal.

Figure 14:
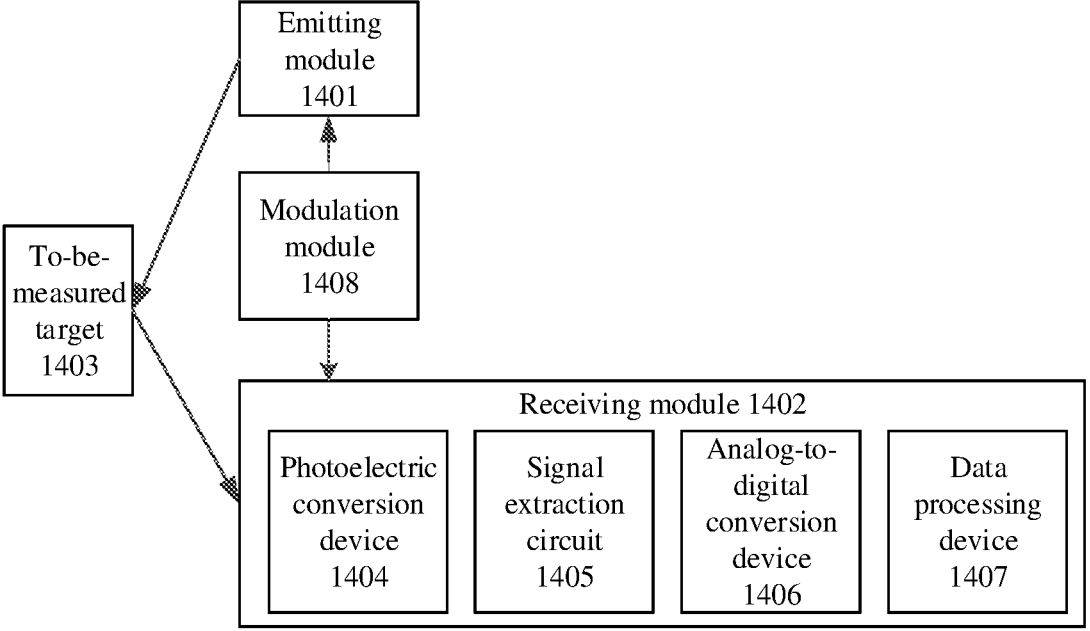
FIG. 14 schematically shows an apparatus for performing ranging by using the signal extraction circuit according to an embodiment of the present disclosure.

A ranging apparatus is further provided according to an embodiment of the present disclosure, including the signal extraction circuit according to any one of the above embodiments. as shown in FIG. 14, the ranging apparatus includes an emitting module 1401, a receiving module 1402.

The emitting module 1401 is configured to emit an emission light signal to obtain an echo signal reflected by a to-be-measured target 1403.

The receiving module 1402 is configured to: receive the echo signal reflected by the to-be-measured target 1403 and a background light signal, and obtain a distance to the to-be-measured target 1403.

Optionally, the ranging apparatus further includes a modulation module 1408. The modulation module 1408 is configured to generate a modulation signal to modulate the emission light signal and demodulation signals.

Optionally, the receiving module 1402 is further configured to: perform signal demodulation based on the modulation signal, and determine the distance between an emitting end, i.e., a light source and the to-be-measured target 1403 based on a demodulation result.

The receiving module 1402 in this embodiment includes: a photoelectric conversion device 1404, a signal extraction circuit 1405, an analog-to-digital conversion device 1406, and a data processing device 1407.

The photoelectric conversion device 1404 is configured to receive the echo signal and/or the background light signal and convert the received echo signal and/or background light signal into electrical charges.

The signal extraction circuit 1405 is configured to separate the echo signal from the electrical charges of the signals received by the receiving module based on the different demodulation signals.

The digital-to-analog conversion device 1406 is configured to convert the echo signal into a digital signal.

The data processing device 1407 is configured to calculate the distance between the ranging apparatus and the to-be-measured target based on the digital signal.

It should be noted that, although several units/modules or sub-units/modules of the apparatus are mentioned in the above detailed description, this division is merely exemplary and not mandatory. According to embodiments of the present disclosure, features and functions of two or more units/modules described above may be embodied in one unit/module. Further, a features and a function of one unit/module described above may be further subdivided to be embodied by multiple units/modules.

Furthermore, although operations of the method provided in the present disclosure are depicted in the figures in a particular order, this does not require or imply that the operations must be performed in the particular order, or that all illustrated operations must be performed to achieve a desired result. Additionally or alternatively, some steps may be omitted, multiple steps may be combined to be performed as one step, and/or one step may be decomposed into multiple steps to be performed.

Although the spirit and principle of the present disclosure is described with reference to several specific embodiments, it should be understood that the present disclosure is not limited to the specific embodiments disclosed, and the division of aspects does mean that features in these aspects cannot be combined to benefit. This division is only for convenience of presentation. The present disclosure is intended to cover various modifications and equivalents included within the spirit and scope of the appended claims.

The invention claimed is:

1. A ranging method performed by using a signal extraction circuit, wherein the signal extraction circuit comprises an integrating unit, at least two charging branches connected with the integrating unit, a power supply, a first signal extraction module, a second signal extraction module, and a demodulation module configured to generate demodulation signals to respectively control the at least two charging branches to be turned on or turned off, wherein the at least two charging branches comprise
a first charging branch in which a signal generating unit is connected with a first end of the integrating unit and a second end of the integrating unit is connected with the power supply, the signal generating unit is configured to convert a received external signal into an electrical signal, and
a second charging branch in which the signal generating unit is connected with the second end of the integrating unit and the first end of the integrating unit is connected with the power supply, wherein an emission light signal emitted from a light source is reflected by a to-be-measured target to obtain an echo signal, and the emission light signal has a pulse width, the demodulation module generates a first demodulation signal, a second demodulation signal, a third demodulation signal and a fourth demodulation signal; and wherein the ranging method comprises:
generating electrical charges by the signal generating unit based on a received background light signal having a preset duration and one part of the echo signal, and controlling the first charging branch of the first signal extraction module to be turned on by using the first demodulation signal so that the current electrical charges in the signal generating unit are transferred to the first end of the integrating unit in the first signal extraction module, wherein a first charge amount of the electrical charges are transferred at an end of the transfer;

generating electrical charges by the signal generating unit based on the received background light signal having the preset duration, and controlling the second charging branch of the first signal extraction module to be turned on by using the second demodulation signal so that the current electrical charges in the signal generating unit are transferred to the second end of the integrating unit in the first signal extraction module, wherein a second charge amount of the electrical charges are transferred at the end of the transfer;

obtaining a first signal extraction result by the integrating unit in the first signal extraction module based on the first charge amount and the second charge amount;

generating electrical charges by the signal generating unit based on the received background light signal having the preset duration and the other part of the echo signal, and controlling the first charging branch of the second signal extraction module to be turned on by using the third demodulation signal, so that the current electrical charges in the signal generating unit are transferred to the first end of the integrating unit in the second signal extraction module, wherein a third charge amount of the electrical charges are transferred at the end of the transfer;

generating electrical charges by the signal generating unit based on the received background light signal having preset duration, and controlling the second charging branch of the second signal extraction module to be turned on by using the fourth demodulation signal so that the current electrical charges in the signal generating unit are transferred to the second end of the integrating unit in the second signal extracting module, wherein a fourth charge amount of electrical charges are transferred at the end of the transfer;

obtaining a second signal extraction result by the integrating unit in the second signal extraction module based on the third charge amount and the fourth charge amount; and calculating a distance between the light source and the to-be-measured target based on the first signal extraction result, the second signal extraction result and the pulse width.

2. The ranging method according to claim 1, wherein the signal generating unit is reset before receiving a signal each time, and the integrating unit is reset after obtaining the signal extraction result each time.

3. The ranging method according to claim 1, wherein a falling edge of the first demodulation signal is aligned with a rising edge of the third demodulation signal, and the second demodulation signal and the fourth demodulation signal do not overlap.

\* \* \* \* \*